US011258492B2

(12) United States Patent
Wang et al.

(10) Patent No.: US 11,258,492 B2
(45) Date of Patent: Feb. 22, 2022

(54) HIGH-SPEED DATA TRANSMISSION DEGRADATION METHOD, DEVICE, AND SYSTEM

(71) Applicant: Huawei Technologies Co., Ltd., Shenzhen (CN)

(72) Inventors: Hongyue Wang, Xi'an (CN); Liping Chen, Xi'an (CN); Shaoli Ren, Xi'an (CN); Haitao Zong, Xi'an (CN); Lingjun Liu, Xi'an (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/477,757

(22) PCT Filed: Jun. 13, 2017

(86) PCT No.: PCT/CN2017/088145
§ 371 (c)(1),
(2) Date: Jul. 12, 2019

(87) PCT Pub. No.: WO2018/129856
PCT Pub. Date: Jul. 19, 2018

(65) Prior Publication Data
US 2019/0363768 A1    Nov. 28, 2019

(30) Foreign Application Priority Data
Jan. 13, 2017    (CN) .......................... 201710026100.5

(51) Int. Cl.
*H04B 7/0456*    (2017.01)
*H04B 7/06*    (2006.01)
(Continued)

(52) U.S. Cl.
CPC .......... *H04B 7/0486* (2013.01); *H04B 7/0632* (2013.01); *H04W 72/085* (2013.01)

(58) Field of Classification Search
CPC .. H04B 7/0486; H04B 7/0632; H04W 72/085
(Continued)

(56) References Cited

U.S. PATENT DOCUMENTS

| 7,583,630 B2 | 9/2009 | Rajkotia et al. | |
| 2009/0270103 A1* | 10/2009 | Pani | H04W 36/0016 455/436 |

(Continued)

FOREIGN PATENT DOCUMENTS

| CN | 102017493 A | 4/2011 |
| CN | 102123507 A | 7/2011 |

(Continued)

OTHER PUBLICATIONS

"3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 14),"3GPP TS 36.300, V14.1.0, Dec. 2016, Dec. 2016, 317 pages.

(Continued)

*Primary Examiner* — Kwang B Yao
*Assistant Examiner* — Xuan Lu
(74) *Attorney, Agent, or Firm* — Conley Rose, P.C.

(57)    ABSTRACT

A high-speed data transmission degradation method, a device, and a system, to implement, in high-speed data transmission and depending on a terminal requirement, resource degradation in which interaction load is low and a terminal remains connected to a network, so as to ensure a data transmission rate of the terminal and improve terminal user experience. The method includes receiving, by a network-side device, a degradation request sent by a terminal that is in a high-speed data transmission mode; obtaining, by the network-side device, a target to-be-degraded resource of the terminal based on the received degradation request; and (Continued)

degrading, by the network-side device, the target to-be-degraded resource.

16 Claims, 8 Drawing Sheets

(51) Int. Cl.
*H04W 72/08* (2009.01)
*H04W 24/02* (2009.01)

(58) Field of Classification Search
USPC .......................................................... 370/329
See application file for complete search history.

(56) References Cited

U.S. PATENT DOCUMENTS

| | | | |
|---|---|---|---|
| 2010/0267394 A1* | 10/2010 | Wu ..................... | H04W 24/08 455/450 |
| 2012/0064909 A1 | 3/2012 | Lindoff et al. | |
| 2012/0307700 A1* | 12/2012 | Nordberg ............. | H04B 7/0413 370/311 |
| 2013/0331077 A1* | 12/2013 | Mucke .................. | H04W 76/30 455/418 |
| 2015/0172032 A1* | 6/2015 | Khay-Ibbat ........... | H04L 5/0057 370/329 |
| 2015/0215793 A1* | 7/2015 | Siomina ................ | G01S 5/0205 455/456.1 |
| 2015/0245219 A1* | 8/2015 | Wei ........................ | H04L 5/001 370/336 |
| 2016/0127997 A1* | 5/2016 | Ang .................. | H04W 52/0216 370/311 |
| 2017/0019306 A1* | 1/2017 | Van Zelst ............. | H04L 1/0079 |
| 2017/0093474 A1 | 3/2017 | Lee et al. | |
| 2018/0199185 A1* | 7/2018 | Tenny ..................... | H04W 8/22 |

FOREIGN PATENT DOCUMENTS

| | | |
|---|---|---|
| CN | 103347293 A | 10/2013 |
| CN | 105472634 A | 4/2016 |
| CN | 106231662 A | 12/2016 |
| WO | 2015182902 A1 | 12/2015 |
| WO | 2016026280 A1 | 2/2016 |

OTHER PUBLICATIONS

"3rd Generation Partnership Project; Technical Specification Group Radio Access Network; Evolved Universal Terrestrial Radio Access (E-UTRA); Radio Resource Control (RRC); Protocol specification (Release 14)," 3GPP TS 36.331, V14.1.0, Dec. 2016, 654 pages.
"3rd Generation Partnership Project; Technical Specification Group Radio Access Network; Evolved Universal Terrestrial Radio Access (E-UTRA); Physical layer procedures (Release 14)," 3GPP TS 36.213, V14.1.0, Part 1, Dec. 2016, 7 pages.
"3rd Generation Partnership Project; Technical Specification Group Radio Access Network; Evolved Universal Terrestrial Radio Access (E-UTRA); Physical layer procedures (Release 14)," 3GPP TS 36.213, V14.1.0, Part 2, Dec. 2016, 41 pages.
"3rd Generation Partnership Project; Technical Specification Group Radio Access Network; Evolved Universal Terrestrial Radio Access (E-UTRA); Physical layer procedures (Release 14)," 3GPP TS 36.213, V14.1.0, Part 3, Dec. 2016, 222 pages.
"3rd Generation Partnership Project; Technical Specification Group Radio Access Network; Evolved Universal Terrestrial Radio Access (E-UTRA); Physical layer procedures (Release 14)," 3GPP TS 36.213, V14.1.0, Part 4, Dec. 2016, 81 pages.
"3rd Generation Partnership Project; Technical Specification Group Radio Access Network; Evolved Universal Terrestrial Radio Access (E-UTRA); Physical layer procedures (Release 14)," 3GPP TS 36.213, V14.1.0, Part 5, Dec. 2016, 51 pages.
"3rd Generation Partnership Project; Technical Specification Group Radio Access Network; Evolved Universal Terrestrial Radio Access (E-UTRA); Physical layer procedures (Release 14)," 3GPP TS 36.213, V14.1.0, Part 6, Dec. 2016, 12 pages.
Vivo, "Discussion on UE initiating radio capability update dynamically," R2-1701487, 3GPP TSG-RAN WG2 Meeting #97, Athens, Greece, Feb. 13-17, 2017, 3 pages.
Huawei, et al., "Thermal issues with high capability UEs," R2-1701835, 3GPP TSG-RAN WG2 #97, Athens, Greece, Feb. 13-17, 2017, 5 pages.
Huawei, "Report of email discussion [97#59][LTE/TEI14] UE requested configuration changes," R2-1703475, 3GPP TSG-RAN WG2 #97bis, Spokane, US, Apr. 3-7, 2017, 14 pages.
Huawei, "Report of email discussion [97bis#07][LTE/TEI14] UE overheating problem," R2-1705512, 3GPP TSG-RAN WG2 #98, Hangzhou, China, May 15-19, 2017, 15 pages.
Huawei Device, et al., "Report of offline discussion #17 on UE overheating problem," R2-1706074, 3GPP TSG-RAN WG2 #98, Hangzhou, China, May 15-19, 2017, 3 pages.
Foreign Communication From A Counterpart Application, Chinese Application No. 17891183.0, Extended European Search Report dated Sep. 11, 2019, 12 pages.
Foreign Communication From A Counterpart Application, PCT Application No. PCT/CN2017/088145, English Translation of International Search Report dated Aug. 30, 2017, 2 pages.
Foreign Communication From A Counterpart Application, PCT Application No. PCT/CN2017/088145, English Translation of Written Opinion dated Aug. 30, 2017, 4 pages.
Machine Translation and Abstract of Chinese Publication No. CN105472634, Apr. 6, 2016, 19 pages.
Machine Translation and Abstract of Chinese Publication No. CN102123507, Jul. 13, 2011, 17 pages.
Machine Translation and Abstract of International Publication No. WO2016026280, Feb. 25, 2016, 29 pages.

* cited by examiner

HIGH-SPEED DATA TRANSMISSION DEGRADATION METHOD, DEVICE, AND SYSTEM

CROSS-REFERENCE RELATED APPLICATIONS

This application is a U.S. National Stage of International Patent Application No. PCT/CN2017/088145 filed on Jun. 13, 2017, which claims priority to Chinese Patent Application No. 201710026100.5 filed on Jan. 13, 2017. Both of the aforementioned applications are hereby incorporated by reference in their entireties.

TECHNICAL FIELD

This application relates to the communications field, and in particular, to a high-speed data transmission degradation method, a device, and a system.

BACKGROUND

With development of communications technologies, a data transmission rate requirement is increasingly high. 3rd Generation Partnership Project (3rd Generation Partnership Project, 3GPP) standard Release 10 introduces carrier aggregation (Carrier Aggregation, CA) and multiple-input multiple-output (Multiple-Input Multiple-Output, MIMO) spatial multiplexing, and continuously evolves toward aggregation of more carriers and MIMO of more independent service flows, to constitute a high-speed data transmission mode. A terminal product is evolved with the standard, and a data transmission rate continuously rises in the high-speed data transmission mode. However, in a high-speed data transmission scenario, power consumption of a terminal continuously increases, and a heat problem is increasingly severe. Heat power consumption test data indicates that, in an extreme scenario (for example, in a case of three-carrier aggregation and four-input four-output MIMO), housing temperature of a terminal rises to approximately 53° C. within 10 minutes, and reaches approximately 70° C. to 80° C. in about one hour, burning a user of the terminal.

Currently, a terminal heat alleviation solution is: When temperature of a terminal rises to a critical value, the terminal performs heat alleviation by turning off a CA/MIMO function and giving up high-speed data transmission; after heat is alleviated, the terminal turns on the CA/MIMO function to increase a rate.

In such a heat alleviation process, to implement a process of turning on/off the CA/MIMO function, the terminal needs to first exit a network and then re-access the network to restart a protocol stack, or the terminal needs to be restarted; as a result, the terminal is disconnected from the network, leading to poor communication experience of a terminal user. In addition, to re-enter the network, the terminal needs to carry a UE capability and performs capability negotiation with a system side, and frequently exiting and entering the network increases signaling interaction load of capability negotiation between the terminal and the system side. Moreover, when the CA/MIMO function is turned off, high-speed data transmission is totally given up, and a data transmission rate of the terminal is reduced. This further reduces experience of the terminal user.

SUMMARY

Embodiments of this application provide a high-speed data transmission degradation method, a device, and a system, to implement, in high-speed data transmission and depending on a terminal requirement, resource degradation in which interaction load is low and a terminal remains connected to a network, so as to ensure a data transmission rate of the terminal and improve terminal user experience.

To achieve the foregoing objectives, the following technical solutions are used in the embodiments of this application:

According to a first aspect, a high-speed data transmission degradation method is provided, including: receiving, by a network-side device, a degradation request sent by a terminal that is in a high-speed data transmission mode, where the degradation request includes a CA degradation parameter and/or a MIMO degradation parameter, the CA degradation parameter is used to instruct the network-side device to perform CA degradation on the terminal, and the MIMO degradation parameter is used to instruct the network-side device to perform MIMO degradation on the terminal; obtaining, by the network-side device, a target to-be-degraded resource of the terminal based on the received degradation request, where the target to-be-degraded resource includes at least one CA component carrier that is to be deactivated when the network-side device performs CA component carrier degradation on the terminal, and/or a quantity of MIMO service flows that is to be deducted when the network-side device performs MIMO degradation on the terminal; and degrading, by the network-side device, the target to-be-degraded resource.

According to the high-speed data transmission degradation method provided in this application, the target to-be-degraded resource of the terminal is degraded based on the degradation request of the terminal. Such a degradation process satisfies a requirement of the terminal, and interaction between the terminal and the network-side device is required only once, ensuring low interaction load. In addition, the target to-be-degraded resource is a CA component carrier and/or a quantity of MIMO service flows of the terminal, and an anchor carrier of the terminal is not used for degradation. This ensures that the terminal remains connected to a network, and therefore, terminal user experience is well improved.

With reference to the first aspect, in a possible implementation, when the degradation request includes the CA degradation parameter, the degradation request may further include an identifier of at least one CA component carrier. In this case, the CA degradation parameter is used to instruct the network-side device to deactivate a CA component carrier indicated by the identifier of the at least one CA component carrier included in the degradation request; correspondingly, the target to-be-degraded resource obtained based on the CA degradation parameter includes the CA component carrier indicated by the identifier of the at least one CA component carrier included in the degradation request. When the degradation request includes the MIMO degradation parameter, the MIMO degradation parameter may be used to instruct the network-side device to reduce a quantity of MIMO service flows of the terminal by a preset step, and correspondingly, the target to-be-degraded resource obtained based on the MIMO degradation parameter includes a MIMO service flow of a flow quantity equal to the preset step. In this implementation, the terminal determines the to-be-degraded resource, and the resource includes the to-be-deactivated CA component carrier and/or the to-be-deducted quantity of MIMO service flows. The terminal informs the network-side device of the resource by using the degradation request, so that the network-side device degrades the resource based on the requirement of the terminal. Determining the to-be-degraded resource by the terminal can better satisfy a service requirement and a capability requirement of the terminal. Therefore, a resource degradation process better satisfies the service and capability requirements of the terminal.

With reference to the first aspect or the foregoing possible implementation, in a possible implementation, the degradation request is only used to instruct the network-side device to perform CA component carrier and/or MIMO service flow degradation on the terminal, and after receiving the degradation request sent by the terminal, the network-side device determines to obtain the target to-be-degraded resource of the terminal. A specific method for determining the target to-be-degraded resource is not specifically limited in this application. Determining the target to-be-degraded resource by the network-side device can better coordinate resources of different terminals from a perspective of unified network management, thereby improving network reliability and resource utilization.

With reference to any one of the first aspect or the foregoing possible implementations, in a possible implementation, the CA degradation parameter may include a channel quality indicator CQI=−1, the MIMO degradation parameter includes a rank rank=−1, and the preset step may include a half of a before-degradation quantity of MIMO service flows. In this implementation, degradation parameter content is defined, so as to better implement the high-speed data transmission degradation method provided in this application.

With reference to any one of the first aspect or the foregoing possible implementations, in a possible implementation, the degradation request is sent when the terminal detects that temperature of the terminal is greater than or equal to a preset threshold, or the degradation request is sent when the terminal estimates that heat production of the terminal is greater than or equal to a heat withstanding capacity of the terminal, or the degradation request is sent by the terminal when radio channel quality of the terminal is less than or equal to a preset threshold. Certainly, a condition for sending the degradation request by the terminal may be configured depending on an actual requirement. This is not specifically limited in this application. Different conditions for sending the degradation request ensure degradation requirements of the terminal in different scenarios.

With reference to any one of the first aspect or the foregoing possible implementations, in a possible implementation, after the receiving, by a network-side device, a degradation request sent by a terminal that is in high-speed data transmission, the high-speed data transmission degradation method provided in this application may further include: determining whether the terminal is capable of proactively initiating degradation, the determining, by the network-side device, a target to-be-degraded resource of the terminal may be specifically implemented as: obtaining, by the network-side device, the target to-be-degraded resource of the terminal if the terminal is capable of proactively initiating degradation. Whether the terminal is capable of proactively initiating degradation is determined for compatibility of different generations of terminal products, to avoid a case in which mis-degradation is performed because a message of a former-generation terminal that is incapable of proactively initiating degradation is mistakenly determined as the degradation request.

With reference to any one of the first aspect or the foregoing possible implementations, in a possible implementation, the determining whether the terminal is capable of proactively initiating degradation may be specifically implemented as: determining whether the 117th bit of a feature group indicator (Feature Group indicators, FGI) information element in a capability indication message of the terminal is 1; and if the 117th bit of the FGI information element in the capability indication message of the terminal is 1, determining that the terminal is capable of proactively initiating degradation; or if the 117th bit of the FGI information element in the capability indication message of the terminal is not 1, determining that the terminal is incapable of proactively initiating degradation. In this implementation, whether the terminal is capable of proactively initiating degradation is clearly defined, so as to improve implementability of the solution in this application.

According to a second aspect, a high-speed data transmission degradation method is provided, including: sending, by a terminal that is in a high-speed data transmission mode, a degradation request to a network-side device, where the degradation request includes a CA degradation parameter and/or a MIMO degradation parameter, the degradation request is used to instruct the network-side device to degrade a target to-be-degraded resource of the terminal, and the target to-be-degraded resource includes at least one CA component carrier, of the terminal, that is to be deactivated when the network-side device performs CA degradation on the terminal, and/or a quantity of MIMO service flows that is to be deducted when the network-side device performs MIMO degradation on the terminal; and transmitting, by the terminal, data on a resource left after degradation of the target to-be-degraded resource.

According to the high-speed data transmission degradation method provided in this application, the terminal sends the degradation request to the network-side device, so that the network-side device degrades the target to-be-degraded resource of the terminal. Such a degradation process satisfies a requirement of the terminal, and interaction between the terminal and the network-side device is required only once, ensuring low interaction load. In addition, the target to-be-degraded resource is a CA component carrier and/or a quantity of MIMO service flows of the terminal, and an anchor carrier of the terminal is not used for degradation. This ensures that the terminal remains connected to a network, and therefore, terminal user experience is well improved.

Further, in a possible implementation, the terminal may determine, in phases, a parameter carried in the degradation request. For example, at a first moment that is set by a user, the degradation request carries the CA degradation parameter, at a second moment that is set by the user, the degradation request carries the MIMO degradation parameter; at a third moment that is set by the user, the degradation request carries the CA degradation parameter and the MIMO degradation parameter. Certainly, moments are not necessarily set by a user, and may alternatively be configured in another form.

Further, in a possible implementation, the terminal may alternately determine a parameter carried in the degradation request. For example, when the terminal sends the degradation request for the first time, the degradation request carries the CA degradation parameter; when the terminal sends the degradation request for the second time, the degradation request carries the MIMO degradation parameter; when the terminal sends the degradation request for the third time, the degradation request carries the CA degradation parameter and the MIMO degradation parameter, when the terminal sends the degradation request for the fourth time, with reference to the degradation request sent for the first time, the degradation request carries the CA degradation parameter; and so on.

Further, in a possible implementation, when the terminal fails to implement final heat alleviation of the entire terminal, the terminal may determine, based on estimation of components of the terminal, whether to continue a degradation operation. For example, the terminal sends the degradation request for the first time, where the degradation request carries the CA degradation parameter and the MIMO degradation parameter, thereby reducing heat of the terminal to some extent. In this case, the terminal may invoke a determining mechanism to determine whether to continue executing a degradation operation. For example, when determining that the degradation operation still needs to be executed, the terminal may send the degradation request for the second time, where the degradation request carries the CA degradation parameter and/or the MIMO degradation parameter, thereby further reducing heat of the terminal to some extent. Such a process of determining and execution is repeated, so as to finally implement heat alleviation of the entire terminal.

Further, in a possible implementation, reference may be further made to a related concept of big data or cloud computing. A server obtains degradation requests of a plurality of terminals, and sends recommendation information to the terminals based on analysis of these degradation requests (degradation parameters), to recommend a parameter to be carried in the degradation request. Alternatively, when the terminal has an adequate processing capability, the terminal may intelligently analyze and determine which parameter carried in a current degradation request can quickly implement heat alleviation of the entire terminal, and the terminal adds the parameter to the to-be-sent degradation request. In this way, heat alleviation of the entire terminal is intelligently and conveniently implemented.

With reference to the second aspect, in a possible implementation, the sending, by a terminal, a degradation request to a network-side device may be specifically implemented as: sending, by the terminal, the degradation request to the network-side device when the terminal detects that temperature of the terminal is greater than or equal to a preset threshold; sending, by the terminal, the degradation request to the network-side device when the terminal determines that heat production of the terminal is greater than or equal to a heat withstanding capacity of the terminal; or sending, by the terminal, the degradation request to the network-side device when the terminal determines that radio channel quality of the terminal is less than or equal to a preset threshold. Certainly, a condition for sending the degradation request by the terminal may be configured depending on an actual requirement. This is not specifically limited in this application. Different conditions for sending the degradation request ensure degradation requirements of the terminal in different scenarios.

With reference to the second aspect or the foregoing possible implementation, in a possible implementation, before the sending, by a terminal, a degradation request to a network-side device, the high-speed data transmission degradation method provided in this application may further include: determining, by the terminal, the target to-be-degraded resource. When the terminal determines the target to-be-degraded resource, and the degradation request includes the CA degradation parameter, the degradation request may further include an identifier of at least one CA component carrier included in the target to-be-degraded resource, and correspondingly, the CA degradation parameter is used to instruct the network-side device to deactivate a CA component carrier indicated by the identifier of the at least one CA component carrier included in the degradation request; the target to-be-degraded resource determined by the terminal includes the CA component carrier indicated by the identifier of the at least one CA component carrier included in the degradation request. When the terminal determines the target to-be-degraded resource, and the degradation request includes the MIMO degradation parameter, the MIMO degradation parameter is used to instruct the network-side device to reduce a quantity of MIMO service flows of the terminal by a preset step, and the target to-be-degraded resource determined by the terminal includes a MIMO service flow of a flow quantity equal to the preset step.

With reference to any one of the second aspect or the foregoing possible implementations, in a possible implementation, the degradation request is only used to instruct the network-side device to perform CA component carrier and/or MIMO service flow degradation on the terminal, and after the network-side device receives the degradation request sent by the terminal, the network-side device determines to obtain the target to-be-degraded resource of the terminal. A specific method for determining the target to-be-degraded resource is not specifically limited in this application. Determining the target to-be-degraded resource by the network-side device can better coordinate resources of different terminals from a perspective of unified network management, thereby improving network reliability and resource utilization.

With reference to any one of the second aspect or the foregoing possible implementations, in a possible implementation, the CA degradation parameter includes a CQI=−1, the MIMO degradation parameter includes a rank rank=−1, and the preset step includes a half of a before-degradation quantity of MIMO service flows.

With reference to any one of the second aspect or the foregoing possible implementations, in a possible implementation, before the sending, by a terminal, a degradation request to a network-side device, the high-speed data transmission degradation method provided in this application may further include: sending, by the terminal, a capability indication message of the terminal to the network-side device, where the 117th bit of an FGI information element in the capability indication message of the terminal is 1, and that the 117th bit of an FGI information element in the capability indication message of the terminal is 1 is used to indicate that the terminal is capable of proactively initiating degradation. In this implementation, whether the terminal is capable of proactively initiating degradation is clearly defined, so as to improve implementability of the solution in this application. The network-side device determines whether the terminal is capable of proactively initiating degradation, for compatibility of different generations of terminal products. This avoids a case in which mis-degradation is performed because a message of a former-generation terminal that is incapable of proactively initiating degradation is mistakenly determined as the degradation request.

According to a third aspect, an embodiment of this application provides a network-side device, where the network-side device can implement a function of the network-side device in the foregoing method example. The function may be implemented by hardware, or may be implemented by hardware executing corresponding software. The hardware or the software includes one or more modules corresponding to the function.

With reference to the third aspect, in a possible implementation, a structure of the network-side device includes a processor and a transceiver. The processor is configured to support the network-side device in performing a corresponding function in the foregoing method. The transceiver is configured to support communication between the network-side device and another device. The network-side device may further include a memory. The memory is configured to couple to the processor, and store a program instruction and data that are necessary for the network-side device.

According to a fourth aspect, an embodiment of this application provides a terminal, where the terminal can implement a function of the terminal in the foregoing method example. The function may be implemented by hardware, or may be implemented by hardware executing corresponding software. The hardware or the software includes one or more modules corresponding to the function.

With reference to the fourth aspect, in a possible implementation, a structure of the terminal includes a processor and a transceiver. The processor is configured to support the terminal in performing a corresponding function in the foregoing method. The transceiver is configured to support communication between the terminal and another device. The terminal may further include a memory. The memory is configured to couple to the processor, and store a program instruction and data that are necessary for the terminal.

According to a fifth aspect, an embodiment of this application provides a computer storage medium, configured to store a computer software instruction used for the foregoing network-side device, and the computer software instruction includes a program that is designed to execute the foregoing aspect.

According to a sixth aspect, an embodiment of this application provides a computer storage medium, configured to store a computer software instruction used for the foregoing terminal, and the computer software instruction includes a program that is designed to execute the foregoing aspect.

According to a seventh aspect, an embodiment of this application provides a communications system, where the system includes the terminal and the network-side device according to at least one of the foregoing aspects.

The solutions provided in the third aspect and the seventh aspect are used to implement the high-speed data transmission degradation method provided in the first aspect or the second aspect, and therefore can achieve beneficial effects the same as those achieved according to the first aspect or the second aspect. Details are not described herein again.

DESCRIPTION OF EMBODIMENTS

Figure 1:
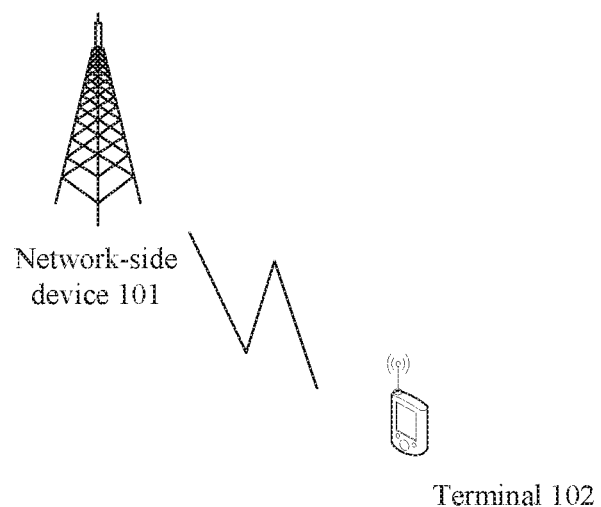
FIG. 1 is a schematic diagram of a communications network architecture according to the prior art.

Carrier aggregation is introduced from 3GPP standard Release 10. Since then, CA+MIMO products have been continuously seeking after a high rate and been continuously upgraded, to satisfy a market requirement. CAT levels of terminal products are continuously upgraded, and a future terminal product is an over 1G CAT16 product. While a product rate increases, a terminal product appearance becomes smaller and thinner. In a 3GPP standard, a network unidirectionally instructs to control CA and MIMO, and a terminal passively executes an operation according to an instruction. Such a disadvantage of unidirectionally controlling CA+MIMO by a system side causes a problem that UE cannot perform a service depending on an actual status. In a high-rate mode, a quantity of channels of an RF and a baseband increases load of a related component, and a heat problem and a power consumption problem cannot be alleviated. As a result, a terminal cannot enjoy a high-speed service, and a network capacity cannot be scheduled based on a terminal status, leading to a waste of resources. In some scenarios, the terminal needs to perform degradation on high-speed data transmission used by the terminal, so as to meet a requirement of the terminal.

Based on this, a basic principle of the embodiments of the present invention is: A terminal sends a degradation request to a network-side device depending on a requirement of the terminal, and the network-side device obtains a to-be-degraded resource based on the request of the terminal and performs degradation. In the degradation, a resource for high-speed data transmission is degraded based on the requirement of the terminal, a main link between the terminal and the network-side device is not used, and interaction between the terminal and the network-side device is required only once. Therefore, in high-speed data transmission, resource degradation in which interaction load is low and the terminal remains connected to a network is implemented based on the requirement of the terminal, so as to ensure a data transmission rate of the terminal and improve terminal user experience. According to the method, CA and MIMO are controlled dynamically, proactively, and online. This brings excellent communication experience, and contributes to proper scheduling performed by a system side on UE. In addition, due to gentle alleviation of power consumption and heat, a brand new smaller and thinner design basis is brought for a terminal appearance.

It should be noted that the network-side device described in this application is a device that communicates with the terminal and that is on a side opposite to a user side in a communications system. The network-side device may be a base station in a wireless network, a core network device, or the like. In communications systems of different standards, network-side devices may have different names, but all the network-side devices may be understood as the network-side device described in this application. A type of the network-side device is also not specifically limited in the embodiments of this application.

It should be further noted that the terminal described in this application is a mobile communications device used by a user. The terminal may be a mobile phone, a tablet computer, a notebook computer, an ultra-mobile personal computer (Ultra-mobile Personal Computer, UMPC), a netbook, a personal digital assistant (Personal Digital Assistant, PDA), an ebook, a mobile television, a wearable device, a personal computer (Personal Computer. PC), or the like. In communications systems of different standards, terminals may have different names, but all the terminals may be understood as the terminal described in this application. A type of the terminal is also not specifically limited in the embodiments of this application.

A connection high-speed data transmission degradation method provided in this application may be applied to a communications network architecture shown in FIG. 1. As shown in FIG. 1, the communications network architecture includes at least one network-side device 101, and a terminal 102 in a high-speed data transmission mode that interacts with the network-side device 101 to perform communication.

It should be noted that FIG. 1 is merely an example of the communications network architecture. A quantity of network-side devices 101 included in the communications network architecture, a type of the network-side device 101, a quantity of terminals, a type of the terminal, a type of a communications system, and the like may all be configured depending on an actual requirement. FIG. 1 is not a specific limitation on the foregoing content. A specific communications network architecture may be a Long Term Evolution (Long Term Evolution. LTE) network, a Universal Mobile Telecommunications System (Universal Mobile Telecommunications System. UMTS) network, or another network. A type of a network to which the solutions of this application are applied is not specifically limited.

The following specifically describes the embodiments of this application with reference to accompanying drawings.

Figure 2:
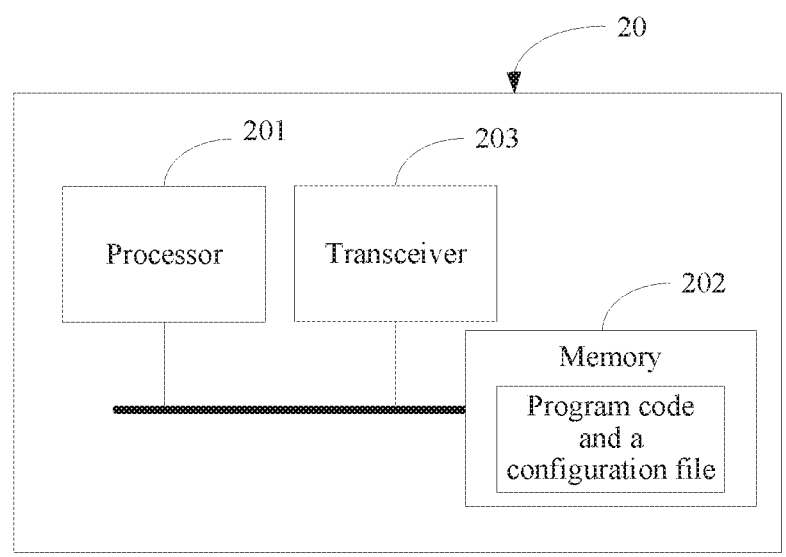
FIG. 2 is a schematic structural diagram of a network-side device according to an embodiment of this application.

As shown in FIG. 2, FIG. 2 shows a network-side device according to an embodiment of this application. The network-side device 20 may be the network-side device 101 in the communications network architecture shown in FIG. 1. As shown in FIG. 2, the network-side device 20 may include a processor 201, a memory 202, and a transceiver 203. The following specifically describes each constituent part of the network-side device 20 with reference to FIG. 2.

The memory 202 may be a volatile memory (volatile memory), such as a random access memory (random access memory, RAM), may be a non-volatile memory (non-volatile memory), such as a read-only memory (read-only memory, ROM), a flash memory (flash memory), a hard disk (hard disk drive, HDD), or a solid state drive (solid state drive, SSD), or may be a combination of the foregoing types of memories. The memory 202 is configured to store program code that can implement the method in this application, and a configuration file.

The processor 201 is a control center of the network-side device 20, and may be a central processing unit (central processing unit, CPU), may be an application-specific integrated circuit (Application-Specific Integrated Circuit, ASIC), or may be configured as one or more integrated circuits implementing the embodiments of this application, for example, one or more microprocessors (digital signal processor, DSP) or one or more field programmable gate arrays (Field Programmable Gate Array, FPGA). The processor 201 may implement various functions of the network-side device 20 by running or executing a software program and/or a module that are/is stored in the memory 202 and by invoking data stored in the memory 202.

The transceiver 203 is used for interaction between the network-side device 20 and another unit. For example, the transceiver 203 may be a transceiver antenna of the network-side device 20.

Specifically, the processor 201 runs or executes the software program and/or the module that are/is stored in the memory 202 and invokes the data stored in the memory 202, to perform the following functions:

receiving, by using the transceiver 203, a degradation request sent by a terminal that is in a high-speed data transmission mode, where the degradation request includes a CA degradation parameter and/or a MIMO degradation parameter, the CA degradation parameter is used to instruct the network-side device to perform CA degradation on the terminal, and the MIMO degradation parameter is used to instruct the network-side device to perform MIMO degradation on the terminal; obtaining a target to-be-degraded resource of the terminal based on the received degradation request, where the target to-be-degraded resource includes at least one CA component carrier that is to be deactivated when the network-side device performs CA component carrier degradation on the terminal, and/or a quantity of MIMO service flows that is to be deducted when the network-side device performs MIMO degradation on the terminal; and degrading the target to-be-degraded resource.

Figure 3:
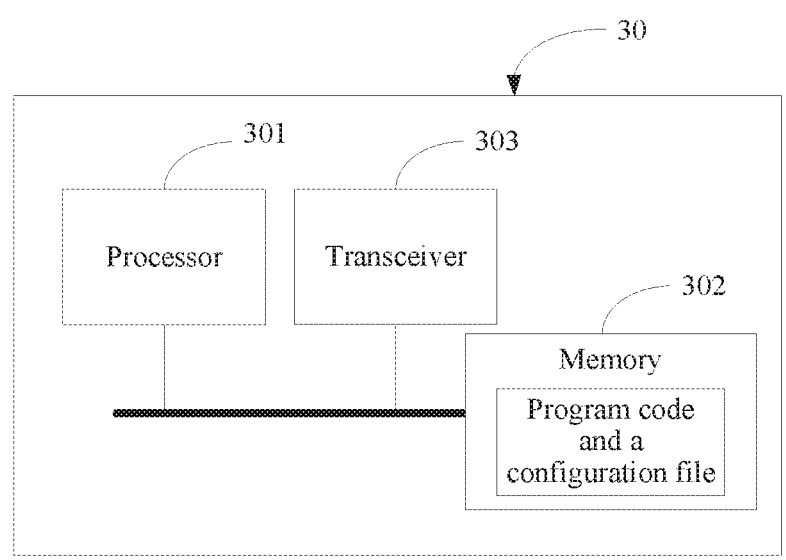
FIG. 3 is a schematic structural diagram of a terminal according to an embodiment of this application.

As shown in FIG. 3, FIG. 3 shows a terminal according to an embodiment of this application. The terminal 30 may be the terminal 102 in the communications network architecture shown in FIG. 1. As shown in FIG. 3, the terminal 30 may include a processor 301, a memory 302, and a transceiver 303. The following specifically describes each constituent part of the terminal 30 with reference to FIG. 3.

The memory 302 may be a volatile memory, such as a RAM, may be a non-volatile memory, such as a ROM, a flash memory, an HDD, or an SSD, or may be a combination of the foregoing types of memories. The memory 302 is configured to store program code that can implement the method in this application, and a configuration file.

The processor 301 is a control center of the terminal 30, and may be a CPU, may be an ASIC, or may be configured as one or more integrated circuits implementing the embodiments of this application, for example, one or more DSPs or one or more FPGAs. The processor 301 may implement various functions of the terminal 30 by running or executing a software program and/or a module that are/is stored in the memory 302 and by invoking data stored in the memory 302.

The transceiver 303 is used for interaction between the terminal 30 and another unit. For example, the transceiver 303 may be a transceiver antenna of the terminal 30.

Specifically, the processor 301 runs or executes the software program and/or the module that are/is stored in the memory 302 and invokes the data stored in the memory 302, to perform the following functions:

sending, by using the transceiver 303, a degradation request to a network-side device, where the degradation request includes a CA degradation parameter and/or a MIMO degradation parameter, the degradation request is used to instruct the network-side device to degrade a target to-be-degraded resource of the terminal, and the target to-be-degraded resource includes at least one CA component carrier, of the terminal, that is to be deactivated when the network-side device performs CA degradation on the terminal, and/or a quantity of MIMO service flows that is to be deducted when the network-side device performs MIMO degradation on the terminal, and supporting the terminal 30 in transmitting data on a resource left after degradation of the target to-be-degraded resource.

Figure 4:
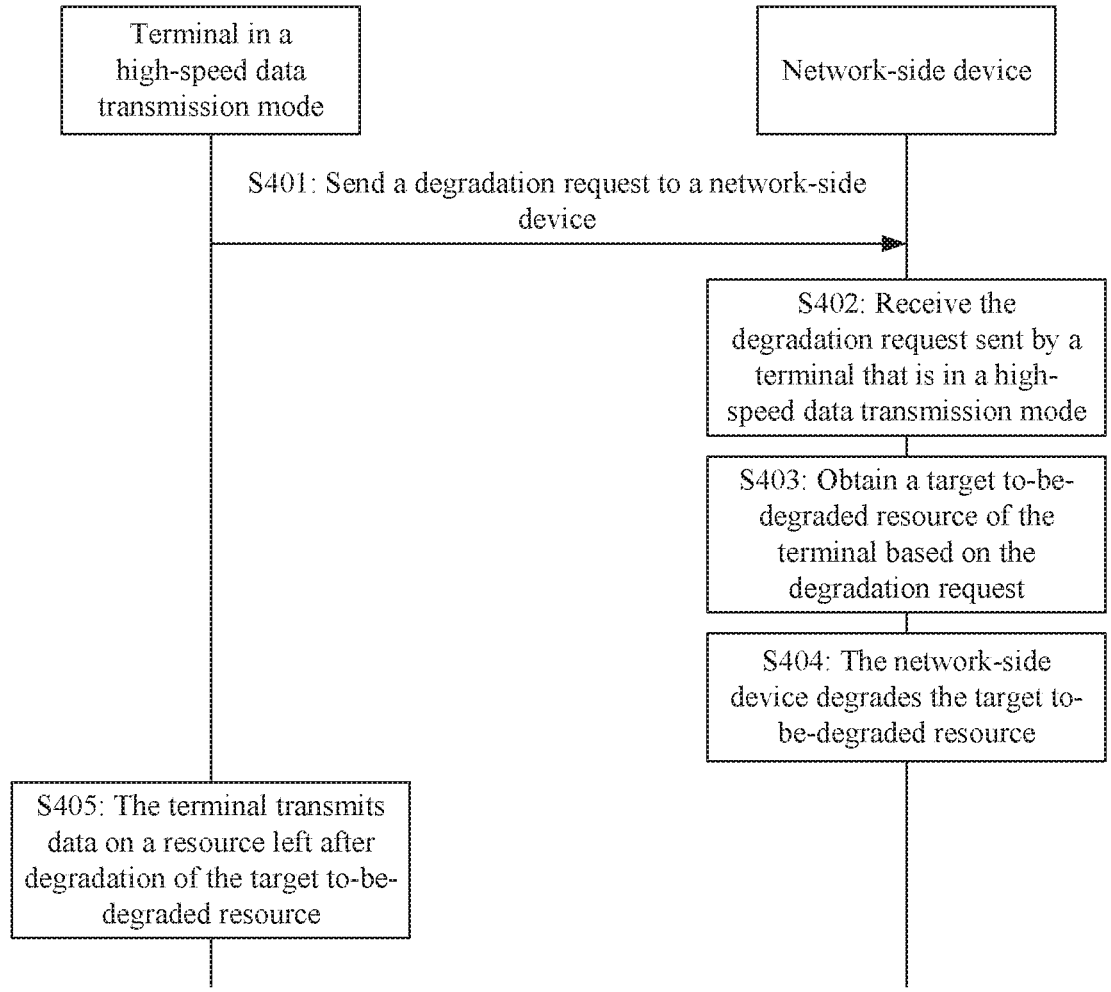
FIG. 4 is a schematic flowchart of a high-speed data transmission degradation method according to an embodiment of this application.

As shown in FIG. 4, an embodiment of this application provides a high-speed data transmission degradation method, applied to interaction between a network-side device and a terminal. The method may include the following steps.

S401: A terminal that is in a high-speed data transmission mode sends a degradation request to a network-side device. To be specific, this may be understood as: The terminal sends the degradation request to the network-side device, and the terminal currently has high-speed data transmission. For ease of understanding, the terminal is referred to as the terminal that is in the high-speed data transmission mode.

The degradation request may include a CA degradation parameter and/or a MIMO degradation parameter. The degradation request is used to instruct the network-side device to degrade a target to-be-degraded resource of the terminal.

Specifically, the target to-be-degraded resource may include at least one CA component carrier, of the terminal, that is to be deactivated when the network-side device performs CA degradation on the terminal, and/or a quantity of MIMO service flows that is to be deducted when the network-side device performs MIMO degradation on the terminal.

It should be noted that content included in the target to-be-degraded resource depends on content of the degradation request. That the degradation request includes the CA degradation parameter determines that the target to-be-degraded resource includes the at least one CA component carrier, of the terminal, that is to be deactivated when the network-side device performs CA degradation on the terminal. That the degradation request includes the MIMO degradation parameter determines that the target to-be-degraded resource includes the quantity of MIMO service flows that is to be deducted when the network-side device performs MIMO degradation on the terminal.

Optionally, a condition for sending the degradation request may be configured depending on an actual requirement. This is not specifically limited in this embodiment of this application. The following describes, as an example, three conditions for sending the degradation request by the terminal. However, this is not a specific limitation on the condition for sending the degradation request by the terminal.

Condition 1: The degradation request is sent when the terminal detects that temperature of the terminal is greater than or equal to a preset threshold.

Specifically, according to condition 1, the terminal may detect temperature of the terminal in real time or periodically. The temperature of the terminal reflects a heating status of the terminal. When the terminal detects that the temperature of the terminal is greater than or equal to the preset threshold, it indicates that the terminal needs to perform heat alleviation. In this case, the terminal sends the degradation request to degrade the high-speed data transmission mode, so as to reduce heat production of the terminal. A value of the preset threshold may be set depending on an actual requirement, and is not specifically limited herein.

Condition 2: The degradation request is sent when the terminal estimates that heat production of the terminal is greater than or equal to a heat withstanding capacity of the terminal.

Specifically, in condition 2, the terminal may detect heat production of the terminal in real time or periodically. The heat production may include temperature or another factor. When the heat production of the terminal is greater than the heat withstanding capacity of the terminal, it indicates that the terminal needs to perform heat alleviation. In this case, the terminal sends the degradation request to degrade the high-speed data transmission mode, so as to reduce the heat production of the terminal. For example, the terminal may estimate the heat withstanding capacity of the terminal based on power consumption, temperature, a battery level, and the like of the terminal. It should be noted that details about a heat withstanding capacity estimation process of the terminal are not described in this embodiment of this application. Any method for estimating the heat withstanding capacity of the terminal may be applied in this case.

Condition 3: The degradation request is sent by the terminal when radio channel quality of the terminal is less than or equal to a preset threshold.

Specifically, in condition 3, the terminal may monitor radio channel quality between the terminal and the network-side device in real time or periodically. When the radio channel quality of the terminal is less than or equal to the preset threshold, it indicates that the terminal cannot bear excessively-high-rate data transmission. In this case, the terminal sends the degradation request to degrade the high-speed data transmission mode, so as to adapt to network performance of the terminal and save network resources. A value of the preset threshold may be set depending on an actual requirement, and is not specifically limited herein. An estimation parameter of the radio channel quality and a method for monitoring the radio channel quality are also not specifically limited in this embodiment of this application, and may be configured depending on an actual requirement.

Optionally, in actual application, the target to-be-degraded resource may be determined before the terminal sends the degradation request, or may be determined after the network-side device receives the degradation request. An execution body that determines the target to-be-degraded resource is not specifically limited in this embodiment of this application. The following separately describes specific solutions in which the terminal or the network-side device determines the target to-be-degraded resource.

In a first case, the terminal determines the target to-be-degraded resource. For example, the terminal determines the target to-be-degraded resource before sending the degradation request.

Optionally, the terminal may determine, through decision making, the at least one CA component carrier and/or the to-be-deducted quantity of MIMO flows in the target to-be-degraded resource based on a service parameter of the terminal.

For example, the service parameter of the terminal may include but is not limited to: a service type of each CA component carrier, a rate, a bandwidth, a frequency channel number, channel quality, service importance. MIMO flow performance, and the like.

It should be noted that the foregoing example merely lists some service parameters of the terminal that can be used for determining the target to-be-degraded resource, but is not a specific limitation on a type of the service parameter, of the terminal, used for determining the target to-be-degraded resource. In actual application, the service parameter, of the terminal, used for determining the target to-be-degraded resource may be selected depending on an actual requirement. This is not specifically limited in this embodiment of this application.

Further, the following describes, by using an example, a process of determining the target to-be-degraded resource based on the service parameter, of the terminal, used for determining the target to-be-degraded resource. However, this is not a specific limitation on the process of determining the target to-be-degraded resource based on the service parameter, of the terminal, used for determining the target to-be-degraded resource.

For example, a correspondence between the service parameter of the terminal and the target to-be-degraded resource is prestored in a system. During determining of the target to-be-degraded resource, the target to-be-degraded resource can be determined by searching for the preset correspondence.

For example, modeling is performed in advance in the system, to establish a model relationship between the service parameter of the terminal and the target to-be-degraded resource. During determining of the target to-be-degraded resource, the service parameter of the terminal is used as an input of a pre-established model, and the corresponding target to-be-degraded resource is determined as an output of the model. Details about a modeling process are not described in this embodiment of this application, and any modeling method may be used in this case. Further, establishment of the model relationship between the service parameter of the terminal and the target to-be-degraded resource may be continuously updated and learned in a system running process. Details about the update and learning process are also not described in this embodiment of this application. Any update and learning process may be applied in this case.

It should be noted that the foregoing is merely an example for describing the process of determining the target to-be-degraded resource based on the service parameter, of the terminal, used for determining the target to-be-degraded resource. In actual application, the service parameter, of the terminal, used for determining the target to-be-degraded resource may alternatively be flexibly selected depending on an actual requirement. This is not limited in this embodiment of this application. All processes of determining the target to-be-degraded resource based on the service parameter, of the terminal, used for determining the target to-be-degraded resource fall within the protection scope of this application.

Optionally, in the process of determining the target to-be-degraded resource, if the terminal determines a to-be-deactivated CA component carrier, the terminal may determine only a CA component carrier that is to be deactivated in current degradation, or may determine a sequence of to-be-deactivated CA component carriers. The CA component carrier sequence is used for sequential deactivation when degradation is performed a plurality of times.

Corresponding to the foregoing first case, the terminal determines the target to-be-degraded resource before sending the degradation request. When the degradation request includes the CA degradation parameter, the degradation request may further include an identifier of the at least one CA component carrier. When receiving the degradation request, the network-side device may obtain the at least one CA component carrier in the target to-be-degraded resource based on the degradation request. In this case, the CA degradation parameter is used to instruct the network-side device to deactivate a CA component carrier indicated by the identifier of the at least one CA component carrier included in the degradation request, and the target to-be-degraded resource includes the CA component carrier indicated by the identifier of the at least one CA component carrier included in the degradation request.

Corresponding to the foregoing first case, the terminal determines the target to-be-degraded resource before sending the degradation request. When the degradation request includes the MIMO degradation parameter, the MIMO degradation parameter may be used to instruct the network-side device to reduce a quantity of MIMO service flows of the terminal by a preset step. When receiving the degradation request, the network-side device may obtain the to-be-deducted quantity of MIMO service flows in the target to-be-degraded resource based on the degradation request. In this case, the target to-be-degraded resource includes a MIMO service flow of a flow quantity equal to the preset step.

It should be noted that the preset step may be set to a fixed value or a dynamic value related to a latest quantity of MIMO service flows, depending on an actual requirement. This is not specifically limited in this embodiment of this application. Optionally, the preset step may include a half of a before-degradation quantity of MIMO service flows. Optionally, in a manner that improves user experience, the MIMO degradation request and/or the preset step may be set by a user; then, the parameter set by the user is added to the degradation request, and is sent with the degradation request to a network device on a server side.

Corresponding to the foregoing first case, the terminal determines the target to-be-degraded resource before sending the degradation request. When the degradation request includes the MIMO degradation parameter, the degradation request may further include the to-be-deducted quantity of MIMO flows. When receiving the degradation request, the network-side device may obtain the to-be-deducted quantity of MIMO service flows in the target to-be-degraded resource based on the degradation request. In this case, the target to-be-degraded resource includes the to-be-deducted quantity of MIMO service flows in the degradation request.

Certainly, when the terminal determines the target to-be-degraded resource before sending the degradation request, the terminal may add the target to-be-degraded resource to the degradation request in another form, so that the network-side device can directly obtain content of the target to-be-degraded resource when receiving the degradation request. Specific implementations are not listed in this embodiment of this application one by one.

In a second case, the network-side device that receives the degradation request determines the target to-be-degraded resource.

For example, the terminal that is in high-speed data transmission sends the degradation request to the network-side device when requesting the network-side device to degrade a resource of the terminal, and the network-side device determines the target to-be-degraded resource after receiving the degradation request. To be specific, the CA degradation parameter and/or the MIMO degradation parameter included in the degradation request sent by the terminal are/is merely used to instruct the network-side device to degrade the target to-be-degraded resource of the terminal. However, specific content of the target to-be-degraded resource is determined by the network-side device after receiving the degradation request.

Optionally, the network-side device may determine, through decision making, the at least one CA component carrier and/or the to-be-deducted quantity of MIMO flows in the target to-be-degraded resource based on a service parameter of the terminal.

It should be noted that, for a process of determining, by the network-side device through decision making, the target to-be-degraded resource based on the service parameter of the terminal in the second case, reference may be made to the process of determining, by the terminal through decision making, the target to-be-degraded resource based on the service parameter of the terminal in the first case. Details are not described herein again.

Further optionally, regardless of whether the target to-be-degraded resource is determined by the terminal or the network-side device, a degradation request form, and content and a form of the CA degradation parameter and/or the MIMO degradation parameter included in the degradation request are not specifically limited in this embodiment of this application, and may be configured depending on an actual requirement. All messages that are sent by the terminal to a network side and that instruct the network-side device to degrade a resource of the terminal may be referred to as the degradation request described in this application. All information that is sent by the terminal to the network side and that instructs the network-side device to deactivate a CA component carrier of the terminal may be referred to as the CA degradation parameter described in this application. All information that is sent by the terminal to the network side and that instructs the network-side device to reduce MIMO service flows of the terminal may be referred to as the MIMO degradation parameter described in this application.

Optionally, referring to a conventional parameter configuration, a parameter used for degradation usually may be configured as a negative value. For example, the CA degradation parameter includes a CQI=−1, and the MIMO degradation parameter includes a rank rank=−1. The CQI=−1 is used to instruct to perform CA carrier component degradation, and the rank=−1 is used to instruct to reduce a quantity of MIMO service flows by half.

It should be noted that the foregoing is merely an example for describing content and forms of the CA degradation parameter and the MIMO degradation parameter, but constitutes no specific limitation on the content and the forms.

S402: The network-side device receives the degradation request sent by the terminal that is in the high-speed data transmission mode.

The degradation request received by the network-side device in S402 is the degradation request sent by the terminal that is in the high-speed data transmission mode in S401. The degradation request is described in detail in S401, and details are not described herein again.

S403: The network-side device obtains the target to-be-degraded resource of the terminal based on the degradation request.

The target to-be-degraded resource includes the at least one CA component carrier, of the terminal, that is to be deactivated when the network-side device performs CA component carrier degradation on the terminal, and/or the quantity of MIMO service flows that is to be deducted when the network-side device performs MIMO degradation on the terminal. Content of the target to-be-degraded resource is described in detail in S401, and details are not described herein again.

Specifically, for the two cases in S401, processes of obtaining, by the network-side device, the target to-be-degraded resource of the terminal based on the degradation request in S403 are different. Specific descriptions are provided for the following two cases.

Case 1: Corresponding to the first case in S401, the terminal determines the target to-be-degraded resource before sending the degradation request.

For example, in case 1, when the degradation request includes the CA degradation parameter, the degradation request further includes an identifier of the at least one CA component carrier, and the network-side device determines, based on the degradation request, that the target to-be-degraded resource includes a CA component carrier indicated by the identifier of the at least one CA component carrier included in the degradation request.

For example, in case 1, when the degradation request includes the MIMO degradation parameter, the MIMO degradation parameter may have a definite definition according to a network configuration, and it is defined that the MIMO degradation parameter is used to instruct the network-side device to reduce the quantity of MIMO service flows of the terminal by the preset step. The network-side device determines, based on the degradation request, that the target to-be-degraded resource includes the MIMO service flow of the flow quantity equal to the preset step.

For example, in case 1, when the degradation request includes the MIMO degradation parameter, the degradation request further includes the to-be-deducted quantity of MIMO flows, and the network-side device determines, based on the degradation request, that the target to-be-degraded resource includes the to-be-deducted quantity of MIMO flows in the degradation request.

Certainly, in case 1, when the terminal determines the target to-be-degraded resource before sending the degradation request, the terminal may add the target to-be-degraded resource to the degradation request in another form, so that the network-side device correspondingly obtains content of the target to-be-degraded resource directly when receiving the degradation request. Specific implementations are not listed in this embodiment of this application one by one.

Case 2: Corresponding to the second case in S401, the network-side device determines the target to-be-degraded resource after receiving the degradation request.

In case 2, the network-side device directly determines the target to-be-degraded resource in S403. A determining process is described in detail in S401, and details are not described herein again.

S404: The network-side device degrades the target to-be-degraded resource.

Specifically, when content of the target to-be-degraded resource is different, processes of degrading, by the network-side device, the target to-be-degraded resource in S404 are different. Detailed descriptions are provided for the following two solutions.

Solution 1: Perform CA Carrier Component Degradation.

Performing CA carrier component degradation is deactivating a CA carrier component. Such a process requires cooperation of the terminal. In solution 1, a process of degrading, by the network-side device, a CA carrier component (for example, a carrier component 1) may specifically include: The network-side device sends a degradation instruction to the terminal, where the degradation instruction includes the carrier component 1; and the terminal deactivates the carrier component 1 after receiving the degradation instruction. Then, the terminal terminates communication with the network-side device on the carrier component 1. The foregoing is merely an example for describing the CA carrier component degradation process, and constitutes no specific limitation.

Solution 2: Perform MIMO Service Flow Degradation.

Performing MIMO service flow degradation is reducing a quantity of MIMO service flows. In solution 2, when performing MIMO service flow degradation on the terminal, the network-side device directly reduces the quantity of MIMO service flows of the terminal, so that the terminal works on a remaining MIMO service flow. In this way, MIMO service flow degradation is completed. The foregoing is merely an example for describing a MIMO service flow degradation process, and constitutes no specific limitation.

S405: The terminal transmits data on a resource left after degradation of the target to-be-degraded resource.

Specifically, after the network-side device degrades the target to-be-degraded resource of the terminal in S404, the terminal transmits data to the network-side device on the resource left after degradation of the target to-be-degraded resource. At this moment, in a high-speed data transmission mode of the terminal, the target to-be-degraded resource is reduced in comparison with that before S401 to S405 are performed.

Optionally, only the CA carrier component or the quantity of MIMO service flows may be degraded in one process of performing S401 to S405. Alternatively, the CA carrier component or the quantity of MIMO service flows may be alternately degraded in a plurality of processes of performing S401 to S405. Alternatively, the CA carrier component and the quantity of MIMO service flows may be degraded in one process of performing S401 to S405.

According to the high-speed data transmission degradation method provided in this application, the target to-be-degraded resource of the terminal is degraded based on the degradation request of the terminal. Such a degradation process satisfies a requirement of the terminal, and interaction between the terminal and the network-side device is required only once, ensuring low interaction load. In addition, the target to-be-degraded resource is the CA component carrier and/or the quantity of MIMO service flows of the terminal, and an anchor carrier of the terminal is not used for degradation. This ensures that the terminal remains connected to a network, and therefore, terminal user experience is well improved.

Further, after one process of performing S401 to S405, the terminal estimates whether a service requirement of the terminal is satisfied after the target to-be-degraded resource is degraded. If the service requirement is satisfied, the process is terminated. If the service requirement is not satisfied, the process of performing S401 to S405 may be repeated, to perform a next degradation process. Details are not described herein.

Optionally, the service requirement of the terminal may include but is not limited to a heat alleviation requirement, a channel quality requirement, and the like. Optionally, the estimating, by the terminal, whether a service requirement of the terminal is satisfied after the target to-be-degraded resource is degraded may be performed immediately after S405, or may be performed after preset duration elapses after S405. This is not specifically limited in this embodiment of this application.

It should be noted that a specific value of the preset duration may be configured depending on an actual requirement. This is not specifically limited in this embodiment of this application.

Figure 5:
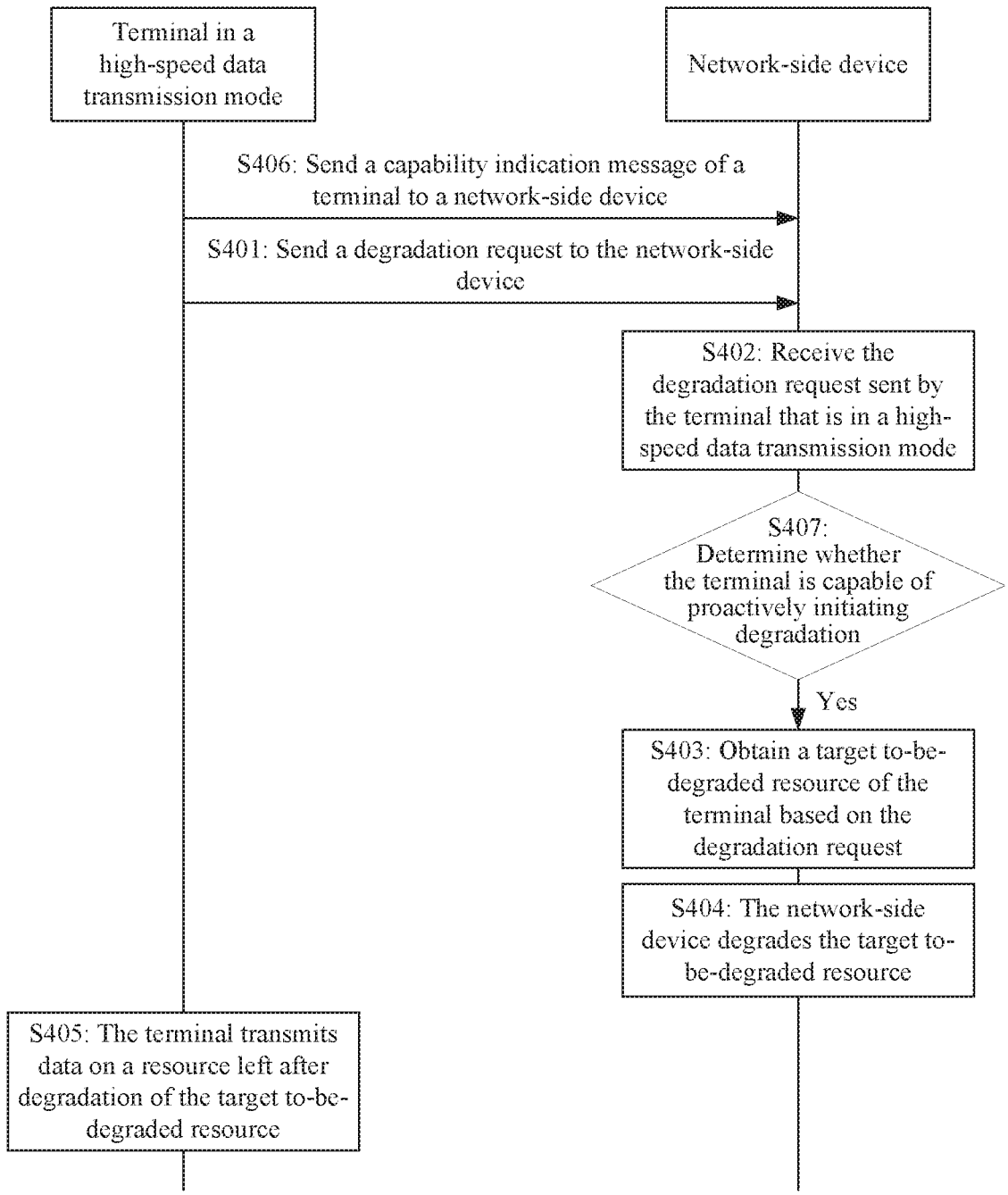
FIG. 5 is a schematic flowchart of a high-speed data transmission degradation method according to an embodiment of this application.

Further, for compatibility of different generations of terminal products, in the high-speed data transmission degradation method provided in this application, information indicating that the terminal is capable of proactively initiating degradation is added, so as to avoid mis-degradation. Therefore, as shown in FIG. 5, the high-speed data transmission degradation method provided in this application may further include S406 before S401.

S406: The terminal sends a capability indication message of the terminal to the network-side device.

The capability indication message of the terminal includes indication information indicating whether the terminal is capable of proactively initiating degradation.

For example, the indication information may include whether the 117th bit of an FGI information element in the capability indication message is 1, to indicate whether the terminal is capable of proactively initiating degradation.

Optionally, an information element that includes indication information used to indicate that the terminal is capable of proactively initiating degradation in the capability indication message of the terminal and a specific location of the indication information in the information element may be configured depending on an actual requirement. This is not specifically limited in this embodiment of this application.

It should be noted that S406 is performed when the terminal accesses a communications network. In this embodiment of this application, no requirement is imposed on a time interval between S406 and S401.

Corresponding to S406, the high-speed data transmission degradation method provided in this application may further include S407 after S401 and before S403.

S407: The network-side device determines whether the terminal is capable of proactively initiating degradation.

Specifically, in S407, the network-side device determines, based on indication information that indicates whether the terminal is capable of proactively initiating degradation and that is included in the capability indication message of the terminal, whether the terminal is capable of proactively initiating degradation.

For example, when the indication information includes whether the 117th bit of an FGI information element in the capability indication message is 1, to indicate whether the terminal is capable of proactively initiating degradation, the determining, by the network-side device, whether the terminal is capable of proactively initiating degradation in S407 may be specifically implemented as: determining, by the network-side device, whether the 117th bit of the FGI information element in the capability indication message of the terminal is 1; and if the 117th bit of the FGI information element in the capability indication message of the terminal is 1, determining that the terminal is capable of proactively initiating degradation; or if the 117th bit of the FGI information element in the capability indication message of the terminal is not 1, determining that the terminal is incapable of proactively initiating degradation.

Further, if it is determined that the terminal is capable of proactively initiating degradation in S407, S403 is performed; if it is determined that the terminal is incapable of proactively initiating degradation in S407, the degradation request received in S402 is ignored.

The foregoing describes the solution provided in this embodiment of this application mainly from a perspective of an interactive working process between the network-side device and the terminal. It can be understood that, to implement the foregoing functions, the network-side device and the terminal include hardware structures and/or software modules corresponding to performing each function. Persons skilled in the art should be easily aware that, in this application, units and algorithm steps in examples described with reference to the embodiments disclosed in this specification may be implemented by hardware or a combination of hardware and computer software. Whether a function is performed by hardware or computer software driving hardware depends on a particular application and a design constraint condition of the technical solution. Persons skilled in the art may use different methods to implement the described functions for each specific application, but it should not be considered that such an implementation goes beyond the scope of this application.

Figure 12:
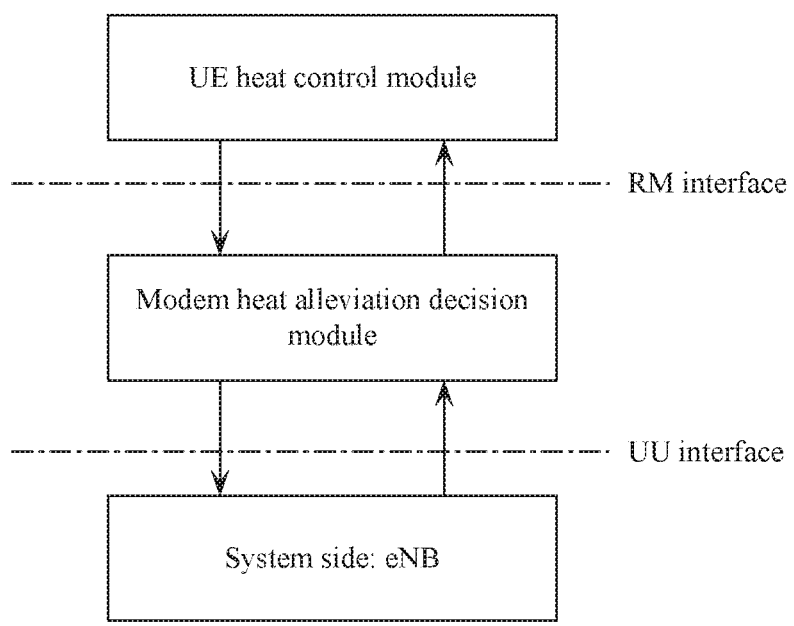
FIG. 12 is a schematic structural diagram of an architecture for implementing this solution according to an embodiment of this application.

For example, from a perspective closer to product implementation, an embodiment is further described as follows. A schematic architectural diagram of this embodiment is shown in FIG. 12.

First step: UE currently runs in a CA+MIMO data transmission service state; a UE heat control module senses a power consumption and heat status of the entire UE, and estimates a heat withstanding capacity of the entire UE based on a status (power consumption, temperature, a battery level, and the like) of the UE; and when the UE can no longer bear a CA+MIMO high-speed data transmission mode due to heat, the UE heat control module notifies a modem of a heat alleviation REQ.

Second step: After receiving the notify heat alleviation REQ sent by the UE heat control module, the modem learns that the UE initiates a heat alleviation requirement; and a modem heat alleviation decision module starts degradation of a CA SCell/a quantity of MIMO flow layers based on a current SCell service type, a rate, bandwidth, a frequency channel number, channel quality CSI, service importance, and a MIMO flow status, and determines a SCell that needs to degraded, a quantity of to-be-degraded SCells, a sequence of MIMO degradation and SCell degradation, and the like.

Third step: If determining to initiate CA degradation, the modem heat alleviation decision module sends a CQI=−1 report for a corresponding SCell (according to Table 1: Heat alleviation CA/MIMO degradation information); or if determining to initiate MIMO degradation, the modem heat alleviation decision module sends a rank=−1 report (according to Table 1: Heat alleviation CA/MIMO degradation information). Report content may further include the quantity of to-be-degraded SCells or the sequence of MIMO flow degradation and SCell degradation. The content may be set differently by the modem heat alleviation decision module based on different UE heat statuses, so that the UE flexibly performs configuration.

Fourth step: If the modem heat alleviation decision module determines to initiate CA degradation, when a system side eNB (base station) receives a CA degradation requirement reported by the modem, the system side eNB determines, based on the 117th bit of a featureGroupIndRel10 information element in a UE capability indication message UE capability information, whether the UE is capable of proactively initiating degradation (if the 117th bit of the featureGroupIndRel10 is 1, the UE is capable of proactively initiating degradation; otherwise, the UE is incapable of proactively initiating degradation), and delivers deactivate SCells (a component carrier reported by the UE) to deactivate a specified component carrier; or if the modem heat alleviation decision module determines to initiate MIMO degradation, when a system side eNB receives a MIMO degradation requirement reported by the modem, the system side eNB determines, based on the 117th bit of a featureGroupIndRel10 information element in a UE capability indication message UE capability information, whether the UE is capable of proactively initiating degradation (if the 117th bit of the featureGroupIndRel10 is 1, the UE is capable of proactively initiating degradation; otherwise, the UE is incapable of proactively initiating degradation), and performs MIMO degradation processing to degrade current independent flows to rank/2 layers.

Fifth step: A modem L1/L2 completes SCell deactivation/detects that MIMO has been degraded, makes a report to the UE heat control module, and notifies a heat alleviation IND; after a time period (the UE heat control module may set a specific time), heat of the UE is alleviated, and in this case, a process ends, and the heat alleviation process is quitted; otherwise, the UE heat control module initiates a new CA/MIMO degradation requirement, and the process is circularly performed.

In the foregoing solution, the following may be further considered: (1) determining whether to degrade in phases; (2) determining whether to alternately perform CA degradation and MIMO degradation; (3) performing re-estimation

TABLE 1

Heat alleviation CA/MIMO degradation report information

| Item | Report value | Meaning | Terminal-side behavior | Network-side behavior |
| --- | --- | --- | --- | --- |
| Carrier aggregation CA | CQI = −1 | Report CQI = −1 for a specified component carrier, and notify a network side to deactivate the component carrier | The UE selects, based on a current service type, a rate, bandwidth, a frequency channel number, channel quality CSI, and the like, a component carrier SCell that needs to be deactivated, and reports the SCell to a network, to determine a terminal requirement for a specified component carrier that currently needs to be activated | Receive a CQI = −1 report for a specified SCell, and deliver signaling for deactivating the component carrier; and deactivate SCells of a quantify of SCells for which CQI = −1 reports are received (the 117th bit of featureGroupIndRel10 is 1) |
| Spatial multiplexing MIMO | Rank = −1 | Report rank = −1, and notify a network side to degrade current MIMO flow's by half | The UE measures a current independent service flow of a terminal service, and reports rank = −1 to notify the network side of a terminal requirement for MIMO degradation | The network side receives a rank = −1 report, and degrades the current MIMO flows by half (the 117th bit of featureGroupIndRel10 is 1) | after phased degradation, to determine whether to degrade subsequently. In other words, the terminal and the network-side device may negotiate or be configured as any one of the foregoing three considerations or a combination of any more than one of the foregoing three considerations. During CA degradation, a specified component carrier for which CQI=−1 is degraded. During MIMO degradation, MIMO is degraded to rank/2 each time. If heat is alleviated in any step of the process, the heat alleviation process is quitted. Otherwise, a next step is performed for circular degradation, until heat of the entire terminal is alleviated. According to such a heat alleviation solution of feedback→estimation→decision→execution, the UE and the network can know a status of each other, and the solution is a heat alleviation solution that achieves excellent smooth online communication experience.

In a consideration implemented in this solution, the 3GPP protocol may be modified as follows. It should be noted that the following modification is merely an example, and there may be another modification form or modification manner. All modifications may be considered as consistent provided that they can similarly achieve an objective of this solution.

Newly added point 1 of the protocol: As shown in Table 2, the 117th bit of 3GPP 36331 Feature group indicators: featureGroupIndRel10 may be added, to determine whether the UE is capable of proactively initiating degradation.

TABLE 2

| 117 | The UE initiates a degraded MIMO or carrier aggregation | This bit can be set to 1 only if the UE supports two or more layers for spatial multiplexing and two or more SCells about carrier aggregation |
|---|---|---|

Newly added point 2 of the protocol: As shown in Table 3, a definition of CQI=−1 may be added to 3GPP 36213 Chapter 7.2.3 Channel Quality Indicator (CQI) definition. The UE reports CQI=−1 to notify a system side to perform CA SCell degradation. After receiving the notification, the system side starts a SCell deactivation process.

TABLE 3

| CQI index | Modulation | Code rate × 1024 | Efficiency |
|---|---|---|---|
| −1 | The UE initiates deactivate SCells while carrier aggregation | | |
| 0 | Out of range | | |
| 1 | QPSK | 78 | 0.1523 |
| 2 | QPSK | 120 | 0.2344 |
| 3 | QPSK | 193 | 0.3770 |

Newly added point 3 of the protocol: Descriptions about CA degradation and MIMO degradation, for example, the following second paragraph, may be added to 3GPP 36300 chapter 11.2 Activation/Deactivation Mechanism.

11.2 Activation/Deactivation Mechanism

To enable reasonable UE battery consumption when CA is configured, an activation/deactivation mechanism of SCells is supported (i.e. activation/deactivation does not apply to PCell).

If featureGroupIndRel10 bit 117 is set to 1, A UE reporting CQI=−1 means that UE hope the network to deactivate the Cell, after network received the degrade information, it should deactivate corresponding SCells.

When an SCells is deactivated, the UE does not need to receive the corresponding PDCCH or PDSCH, cannot transmit in the corresponding uplink, nor is it required to perform CQI measurements.

Newly added point 4 of the protocol: The following content may be added to 3GPP 36213 Chapter 7.2 UE procedure for reporting Channel State Information (CSI).

The time and frequency resources that can be used by the UE to report CSI which consists of Channel Quality Indicator (CQI), precoding matrix indicator (PMI), precoding type indicator (PTI). CSI-RS resource indicator (CRI), and/or rank indication (RI) are controlled by the eNB. If featureGroupIndRel10 bit 117 is set to 1, A UE reporting Rank=−1 means that UE hope the network to degrade MIMO, after network received the degrade information, it should degrade current MIMO layer to half.

Based on the foregoing, the terminal estimates UE power consumption and heat and flexibly configures a terminal working mode, and the terminal and the system side are connected and know a status of each other. In this way, heat alleviation with the terminal remaining online is implemented, and communication experience is excellent. Through interaction, the system side learns about heat power consumption of the UE and a heat withstanding capacity of the UE, thereby flexibly scheduling a system resource and making fullest use of the system resource.

In the embodiments of this application, function module division may be performed on the network-side device and the terminal according to the foregoing method example. For example, each function module may be corresponding to each function. Alternatively, two or more functions may be integrated into one processing module. The integrated module may be implemented in a form of hardware, or may be implemented in a form of a software function module. It should be noted that module division in the embodiments of this application is an example, and is merely logical function division. In actual implementation, there may be another division manner.

Figure 6:
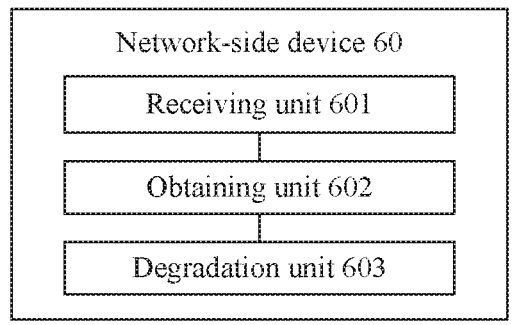
FIG. 6 is a schematic structural diagram of a network-side device according to an embodiment of this application.

When each function module is corresponding to each function, FIG. 6 shows a possible schematic structural diagram of the network-side device in the foregoing embodiment. The network-side device 60 may include a receiving unit 601, an obtaining unit 602, and a degradation unit 603. The receiving unit 601 is configured to support the network-side device 60 in performing the process S402 in FIG. 4 or FIG. 5. The obtaining unit 602 is configured to support the network-side device 60 in performing the process S403 in FIG. 4 or FIG. 5. The degradation unit 603 is configured to support the network-side device 60 in performing the process S404 in FIG. 4 or FIG. 5. For function descriptions of a corresponding function module, reference may be made to all related content of each step in the foregoing method embodiment. Details are not described herein again.

Figure 7:
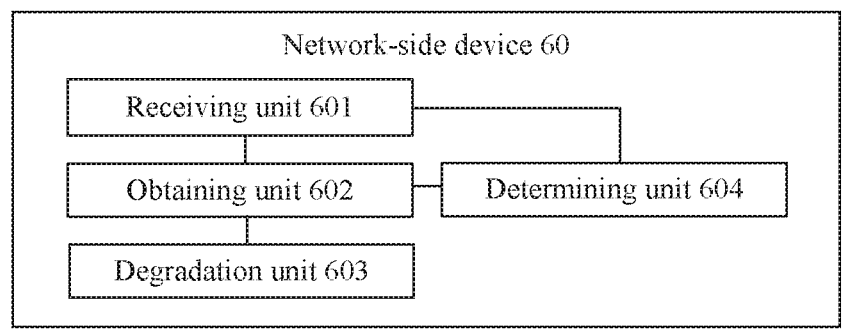
FIG. 7 is a schematic structural diagram of a network-side device according to an embodiment of this application.

Optionally, as shown in FIG. 7, the network-side device 60 may further include a determining unit 604, configured to support the network-side device 60 in performing the process S407 in FIG. 5.

Figure 8:
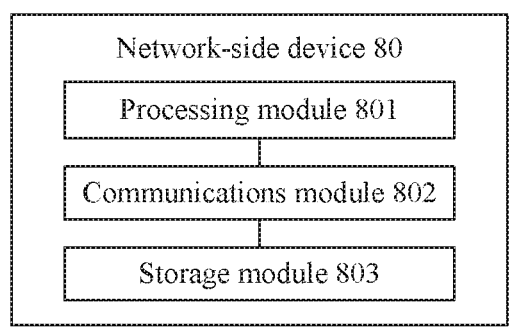
FIG. 8 is a schematic structural diagram of a network-side device according to an embodiment of this application.

When an integrated unit is used, FIG. 8 shows a possible schematic structural diagram of the network-side device in the foregoing embodiment. The network-side device 80 may include a processing module 801 and a communications module 802. The processing module 801 is configured to perform control management on an action of the network-side device 80. For example, the processing module 801 is configured to support the network-side device 80 in performing the process S402 in FIG. 4 or FIG. 5 by using the communications module 801. The processing module 801 is configured to support the network-side device 80 in performing the processes S403 and S404 in FIG. 4 or FIG. 5. The communications module 802 is further configured to support the network-side device 80 in communicating with another network entity. The network-side device 80 may further include a storage module 803, configured to store program code and data of the network-side device 80.

The processing module 801 may be the processor 201 in an entity structure of the network-side device 20 shown in FIG. 2, and may be a processor or a controller. For example, the processing module 801 may be a CPU, a general purpose processor, a DSP, an ASIC, an FPGA or any other programmable logic device, a transistor logic device, a hardware part, or any combination thereof. The processing module 801 can implement or execute various logical blocks, modules, and circuits that are described as examples with reference to content disclosed in this application. The processor 801 may alternatively be a combination implementing a computing function, for example, a combination that includes one or more microprocessors or a combination of a DSP and a microprocessor. The communications module 802 may be the transceiver 203 in the entity structure of the network-side device 20 shown in FIG. 2. The communications module 802 may be a communications port or a transceiver antenna, or may be a transceiver, a transceiver circuit, a communications interface, or the like. The storage module 803 may be the memory 202 in the entity structure of the network-side device 20 shown in FIG. 2.

When the processing module 801 is a processor, the communications module 802 is a transceiver, and the storage module 803 is a memory, the network-side device 80 in FIG. 8 of this embodiment of this application may be the network-side device 20 shown in FIG. 2.

Figure 9:
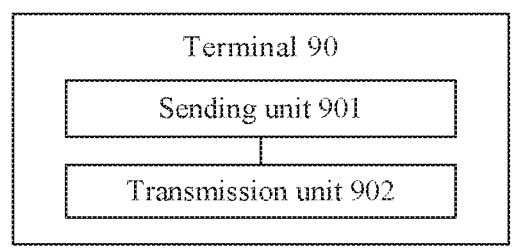
FIG. 9 is a schematic structural diagram of a terminal according to an embodiment of this application.

When each function module is corresponding to each function, FIG. 9 shows a possible schematic structural diagram of the terminal in the foregoing embodiment. The terminal 90 may include a sending unit 901 and a transmission unit 902. The sending unit 901 is configured to support the terminal 90 in performing the process S401 in FIG. 4 or FIG. 5 and the process S406 in FIG. 5. The transmission unit 902 is configured to support the terminal 90 in performing the process S405 in FIG. 4 or FIG. 5. For function descriptions of a corresponding function module, reference may be made to all related content of each step in the foregoing method embodiment. Details are not described herein again.

Figure 10:
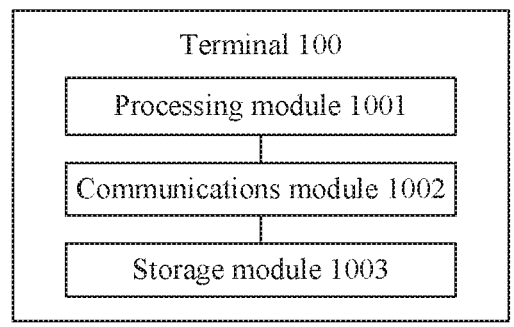
FIG. 10 is a schematic structural diagram of a terminal according to an embodiment of this application.

When an integrated unit is used, FIG. 10 shows a possible schematic structural diagram of the terminal in the foregoing embodiment. The terminal 100 may include a processing module 1001 and a communications module 1002. The processing module 1001 is configured to perform control management on an action of the terminal 100. For example, the processing module 1001 is configured to support the terminal 100 in performing the process S401 in FIG. 4 or FIG. 5 by using the communications module 1002. The processing module 1001 is configured to support the terminal 100 in performing the process S405 in FIG. 4 or FIG. 5. The communications module 1002 is further configured to support the terminal 100 in communicating with another network entity. The terminal 100 may further include a storage module 1003, configured to store program code and data of the terminal 100.

The processing module 1001 may be the processor 301 in an entity structure of the terminal 30 shown in FIG. 3, and may be a processor or a controller. For example, the processing module 1001 may be a CPU, a general purpose processor, a DSP, an ASIC, an FPGA or any other programmable logic device, a transistor logic device, a hardware part, or any combination thereof. The processing module 1001 can implement or execute various logical blocks, modules, and circuits that are described as examples with reference to content disclosed in this application. The processor 1001 may alternatively be a combination implementing a computing function, for example, a combination that includes one or more microprocessors or a combination of a DSP and a microprocessor. The communications module 1002 may be the transceiver 303 in the entity structure of the terminal 30 shown in FIG. 3. The communications module 1002 may be a communications port or a transceiver antenna, or may be a transceiver, a transceiver circuit, a communications interface, or the like. The storage module 1003 may be the memory 302 in the entity structure of the terminal 30 shown in FIG. 3.

When the processing module 1001 is a processor, the communications module 1002 is a transceiver, and the storage module 1003 is a memory, the terminal 100 in FIG. 10 of this embodiment of this application may be the terminal 30 shown in FIG. 3.

Figure 11:
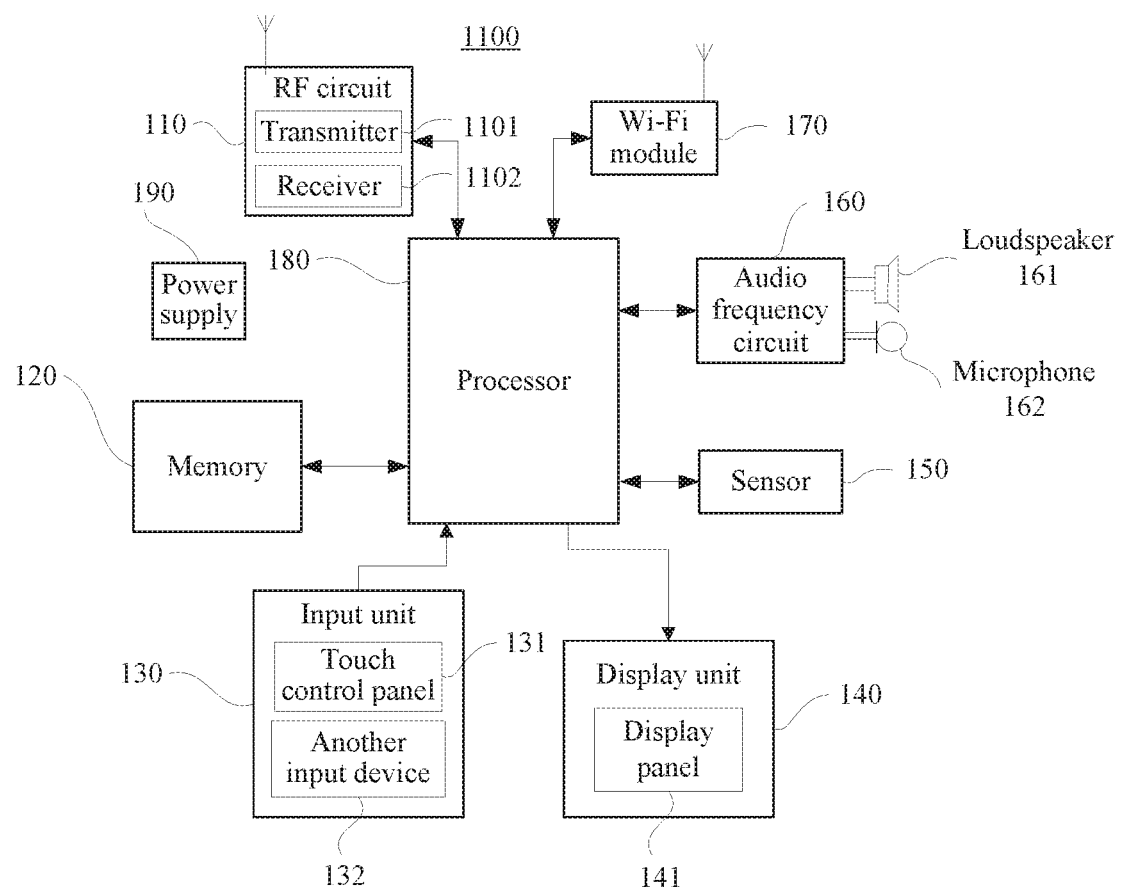
FIG. 11 is a schematic structural diagram of a terminal according to an embodiment of this application.

As shown in FIG. 11, FIG. 11 is a schematic structural diagram of a mobile terminal according to an embodiment of the present invention. The terminal includes a processor, a memory, an input device, a display device, a control device, and the like. A structure of the terminal 1100 in FIG. 11 of this embodiment of this application may be the same as that of the terminal 30 shown in FIG. 3, or may include more internal constituent components. The mobile terminal shown in FIG. 11 may perform all method steps performed by the terminal shown in FIG. 3. It should be understood that the mobile terminal 1100 shown in the figure is merely an example. An actual product may have more or fewer parts than those shown in FIG. 11, may combine two or more parts, or may have parts disposed differently. The mobile terminal shown in the figure may be configured to execute the method shown in FIG. 4 or FIG. 5. Various parts shown in FIG. 11 may be implemented in hardware including one or more signal processors and/or application-specific integrated circuits, software, or a combination of hardware and software. As shown in the figure, the mobile terminal 1100 includes parts such as an RF (Radio Frequency, radio frequency) circuit 110, a memory 120, an input unit 130, a display unit 140, a sensor 150, an audio frequency circuit 160, a Wi-Fi (wireless fidelity, wireless fidelity) module 170, a processor 180, and a power supply 190. The following specifically describes each constituent part.

The RF circuit 110 may be configured to receive and send signals during information receiving and sending or during a call, and particularly, to receive downlink information from a base station and send the downlink information to the processor 180 for processing. In addition, the RF circuit 110 sends uplink data to the base station. Usually, the RF circuit includes but is not limited to an antenna, at least one amplifier, a transmitter 1101, a receiver 1102, a coupler, an LNA (Low Noise Amplifier, low noise amplifier), a duplexer, and the like. In addition, the RF circuit 110 may further communicate with a network and another device through wireless communication. For the wireless communication, any communications standard or protocol may be used, including but not limited to GSM (Global System for Mobile Communications, Global System for Mobile Communications), GPRS (General Packet Radio Service, general packet radio service), CDMA (Code Division Multiple Access, Code Division Multiple Access), WCDMA (Wideband Code Division Multiple Access. Wideband Code Division Multiple Access), LTE (Long Term Evolution, Long Term Evolution), an email, an SMS (Short Messaging Service, Short Message Service), and the like.

The memory 120 may be configured to store a software program and a module. The processor 180 executes various function applications of the mobile terminal 100 and data processing by running the software program and the module that are stored in the memory 120. The memory 120 may mainly include a program storage area and a data storage area. The program storage area may store an operating system, an application program required by at least one function (for example, a voice playback function and a picture playback function), and the like. The data storage area may store data (for example, audio frequency data and a phone book) and the like created based on use of the mobile terminal 100. In addition, the memory 120 may include a high-speed random access memory, and may further include a nonvolatile memory, for example, at least one magnetic disk storage device, and a flash memory device or another volatile solid-state storage device.

The input unit 130 may be configured to receive input numeral or character information, and generate a key signal input related to user setting and function control of the mobile terminal 100. Specifically, the input unit 130 may include a touch control panel 131 and another input device 132. The touch control panel 131, also referred to as a touch screen, can collect a touch operation (for example, an operation performed by a user on the touch control panel 131 or near the touch control panel 131 by using a finger, a stylus, or any other proper object or accessory) performed by the user on or near the touch control panel 131, and drive a corresponding connection device according to a preset program. Optionally, the touch control panel 131 may include two parts: a touch detection apparatus and a touch controller. The touch detection apparatus detects a location touched by the user, detects a signal resulting from a touch operation, and transmits the signal to the touch controller. The touch controller receives touch information from the touch detection apparatus, converts the touch information into touch point coordinates, and sends the touch point coordinates to the processor 180. In addition, the touch controller can receive and execute a command sent by the processor 180. In addition, the touch control panel 131 may be implemented in a plurality of types, such as a resistive type, a capacitive type, an infrared type, and a surface acoustic wave type. In addition to the touch control panel 131, the input unit 130 may further include the another input device 132. Specifically, the another input device 132 may include but is not limited to one or more of a physical keyboard, a function key (for example, a volume control key or an on-off key), a trackball, a mouse, a joystick, or the like.

The display unit 140 may be configured to display information input by the user or information provided for the user, and various menus of the mobile terminal 100. The display unit 140 may include a display panel 141. Optionally, the display panel 141 may be configured in a form of an LCD (Liquid Crystal Display, liquid crystal display), an OLED (Organic Light-Emitting Diode, organic light-emitting diode), or the like. Further, the touch control panel 131 may cover the display panel 141. After detecting a touch operation on or near the touch control panel 131, the touch control panel 131 transmits the touch operation to the processor 180 to determine a touch event type. Then, the processor 180 provides a corresponding visual output on the display panel 141 based on the touch event type. Although in FIG. 1, the touch panel 131 and the display panel 141 are used as two independent parts to implement input and output functions of the mobile terminal 100, yet in some embodiments, the touch panel 131 and the display panel 141 may be integrated to implement the input and output functions of the mobile terminal 100.

The mobile terminal 100 may further include at least one type of sensor 150, such as a fingerprint sensor, an optical sensor, a motion sensor, or another sensor. Specifically, the fingerprint sensor is configured to identify fingerprint information input by the user. The optical sensor may include an ambient light sensor and a proximity sensor. The ambient light sensor may adjust luminance of the display panel 141 based on brightness of ambient light, and the proximity sensor may turn off the display panel 141 and/or backlight when the mobile terminal 100 moves close to an ear. As a type of motion sensor, an accelerometer sensor may detect values of accelerated speeds in various directions (usually three axes), and detect, in a still state, a value and a direction of gravity, and may be used for an application that identifies a mobile terminal posture (for example, screen switch between a portrait mode and a landscape mode, a related game, and magnetometer posture calibration), a vibration identification-related function (for example, a pedometer or tapping), and the like. For other sensors, such as a gyroscope, a barometer, a hygrometer, a thermometer, and an infrared sensor, that may be further configured in the mobile terminal 100, details are not described herein.

The audio frequency circuit 160, a loudspeaker 161, and a microphone 162 may provide an audio interface between the user and the mobile terminal 100. The audio frequency circuit 160 may transmit, to the loudspeaker 161, an electrical signal converted from received audio frequency data. The loudspeaker 161 converts the electrical signal into a sound signal and outputs the sound signal. In addition, the microphone 162 converts a collected sound signal into an electrical signal, and the audio frequency circuit 160 receives the electrical signal, converts the electrical signal into audio frequency data, and outputs the audio frequency data to the RF circuit 108 to send the audio frequency data to, for example, another mobile terminal, or outputs the audio frequency data to the memory 120 for further processing.

Wi-Fi belongs to a short-distance wireless transmission technology. The mobile terminal 100 may help, by using the Wi-Fi module 170, the user to receive and send an email, browse a web page, access streaming media, and the like. The Wi-Fi module 170 provides the user with wireless access to the broadband Internet. Although FIG. 1 shows the Wi-Fi module 170, it can be understood that the Wi-Fi module 170 does not belong to necessary constituents of the mobile terminal 100, and may be completely omitted depending on a requirement, without changing the essence of the present invention.

The processor 180 is a control center of the mobile terminal 100. The processor 180 uses various interfaces and lines to connect all the parts of the entire mobile terminal, and executes various functions of the mobile terminal 100 and data processing by running or executing the software program and/or the module stored in the memory 120 and by invoking data stored in the memory 120, so as to monitor the entire mobile terminal. Optionally, the processor 180 may include one or more processing units. Preferably, the processor 180 may integrate an application processor and a modem processor. The application processor mainly processes an operating system, a user interface, an application program, and the like. The modem processor mainly processes wireless communication. It can be understood that, alternatively, the modem processor may not be integrated into the processor 180.

The mobile terminal 100 further includes the power supply 190 (for example, a battery) that supplies power to each part. Preferably, the power supply may be logically connected to the processor 180 by using a power management system, thereby implementing functions such as charge management, discharge management, and power consumption management by using the power management system.

Although not shown, the mobile terminal 100 may further include a camera, a Bluetooth module, and the like. Details are not described herein.

As described above, the network-side device and the terminal provided in the embodiments of this application may be configured to implement the method implemented according to the foregoing embodiments of this application. For ease of description, only parts related to the embodiments of this application are shown. For specific technical details that are not disclosed, refer to the embodiments of this application.

Further, an embodiment of this application provides a communications system. The communications system may include the network-side device described as an example in any one of the foregoing embodiments and at least one terminal described as an example in any one of the foregoing embodiments.

Steps of methods or algorithms described with reference to content disclosed in this application may be implemented by hardware, or may be implemented by a processor executing a software instruction. The software instruction may include a corresponding software module. The software module may be stored in a RAM, a flash memory, a ROM, an erasable programmable read only memory (Erasable Programmable ROM, EPROM), an electrically erasable programmable read-only memory (Electrically EPROM, EEPROM), a register, a hard disk, removable hard disk, a compact disc read-only memory (CD-ROM), or any other form of a storage medium well known in the art. An example of a storage medium is coupled to a processor, so that the processor can read information from the storage medium and write information into the storage medium. Certainly, the storage medium may alternatively be a constituent part of the processor. The processor and the storage medium may be located in an ASIC. In addition, the ASIC may be located in a core network interface device. Certainly, the processor and the storage medium may alternatively exist in the core network interface device as discrete components.

It can be clearly understood by persons skilled in the art that, for ease and brevity of description, for detailed working processes of the foregoing systems, apparatuses, and units, reference may be made to corresponding processes in the foregoing method embodiments. Details are not described herein again.

Persons skilled in the art should be able to realize that, in one or more of the foregoing examples, the functions described in this application may be implemented by using hardware, software, firmware, or any combination thereof. When the functions are implemented by software, these functions may be stored in a computer-readable medium, or may be transmitted as one or more instructions or code in a computer-readable medium. The computer-readable medium includes a computer storage medium and a communications medium. The communications medium includes any medium that facilitates transmission of a computer program from one place to another. The storage medium may be any available medium accessible to a general-purpose or dedicated computer. It can be clearly understood by persons skilled in the art that, for ease and brevity of description, for detailed working processes of the foregoing systems, apparatuses, and units, reference may be made to corresponding processes in the foregoing method embodiments. Details are not described herein again.

In the several embodiments provided in this application, it should be understood that the disclosed systems, apparatuses, and methods may be implemented in other manners. For example, the described apparatus embodiment is merely an example. For example, the unit division is merely logical function division and may be other division in actual implementation. For example, a plurality of units or components may be combined or may be integrated into another system, or some features may be ignored or not performed. In addition, the displayed or discussed mutual couplings, direct couplings, or communication connections may be implemented by using some interfaces. The indirect couplings or communication connections between the apparatuses or units may be implemented in electrical or other forms.

The units described as separate parts may or may not be physically separate, and parts displayed as units may or may not be physical units, may be located in one position, or may be distributed on a plurality of network units. Some or all of the units may be selected depending on an actual requirement, to achieve the objectives of the solutions in the embodiments.

In addition, functional units in the embodiments of this application may be integrated into one processing unit, or each of the units may be included alone physically, or two or more units may be integrated into one unit. The integrated unit may be implemented in a form of hardware, or may be implemented in a form of hardware in addition to a software function unit.

When the foregoing integrated unit is implemented in the form of a software function unit, the integrated unit may be stored in a computer-readable storage medium. The software function unit is stored in a storage medium, and includes several instructions for instructing a computer device (which may be a personal computer, a server, a network device, or the like) to perform some of the steps of the methods described in the embodiments of this application. The foregoing storage medium includes any medium that can store program code, such as a USB flash drive, a removable hard disk, a read-only memory (Read-Only Memory, ROM), a random access memory (Random Access Memory. RAM), a magnetic disk, or an optical disc.

Finally, it should be noted that the foregoing embodiments are merely intended for describing the technical solutions of this application, rather than limiting this application. Although this application is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the embodiments of this application.

What is claimed is:

1. A high-speed data transmission degradation method implemented by a network-side device, comprising:
   receiving a degradation request from a terminal that is in a high-speed data transmission mode, wherein the degradation request comprises a carrier aggregation (CA) degradation parameter, and wherein the CA degradation parameter comprises an identifier of a CA component carrier and instructs the network-side device to perform CA degradation on the terminal by deactivating the CA component carrier;

determining whether the terminal is capable of proactively initiating degradation, wherein determining whether the terminal is capable of proactively initiating degradation comprises:
  determining whether a 117th bit of a feature group indicator (FGI) information element in a capability indication message of the terminal is 1;
  determining that the terminal is capable of proactively initiating degradation when the 117th bit of the FGI information element in the capability indication message of the terminal is 1; and
  determining that the terminal is incapable of proactively initiating degradation when the 117th bit of the FGI information element in the capability indication message of the terminal is not 1;
when the terminal is capable of proactively initiating degradation, obtaining a target to-be-degraded resource of the terminal indicated by the identifier in the degradation request, wherein the target to-be-degraded resource comprises the CA component carrier that is to be deactivated when the network-side device performs CA component carrier degradation on the terminal; and
degrading the target to-be-degraded resource.

2. The high-speed data transmission degradation method of claim 1, wherein the high-speed data transmission degradation method further comprises receiving a multiple-input multiple-output (MIMO) degradation parameter, wherein the MIMO degradation parameter instructs the network-side device to reduce a quantity of MIMO service flows of the terminal.

3. The high-speed data transmission degradation method of claim 1, wherein the CA degradation parameter comprises a channel quality indicator (CQI) equal to negative 1.

4. The high-speed data transmission degradation method of claim 1, wherein the degradation request is sent when the terminal detects that temperature of the terminal is greater than or equal to a preset threshold.

5. The high-speed data transmission degradation method of claim 1, wherein the degradation request is sent when the terminal estimates that heat production of the terminal is greater than or equal to a heat withstanding capacity of the terminal.

6. The high-speed data transmission degradation method of claim 1, wherein the degradation request is sent when radio channel quality of the terminal is less than or equal to a preset threshold.

7. A terminal, comprising:
a processor;
a transmitter coupled to the processor;
a receiver coupled to the processor; and
a memory coupled to the processor and configured to store a computer executable instruction, wherein the processor is configured to execute the computer executable instruction to configure the terminal to:
determine a target to-be-degraded resource, wherein the target to-be-degraded resource comprises a carrier aggregation (CA) component carrier of the terminal that is to be deactivated when a network-side device performs CA degradation on the terminal, wherein the terminal is capable of proactively initiating degradation, and wherein a 117th bit of a feature group indicator (FGI) information element in a capability indication message of the terminal is 1;
send a degradation request to a network-side device using the transmitter, wherein the degradation request comprises an identifier of the CA component carrier and instructs the network-side device to degrade the target to-be-degraded resource of the terminal by deactivating the CA component carrier indicated by the identifier; and
instruct the transmitter to transmit and the receiver to receive data on a resource left after degradation of the target to-be-degraded resource.

8. The terminal of claim 7, wherein sending, by the transmitter, the degradation request to the network-side device comprises instructing, by the processor, the transmitter to send the degradation request to the network-side device when detecting that a temperature of the terminal is greater than or equal to a preset threshold.

9. The terminal of claim 7, wherein the processor is further configured to send to a network-side device a multiple-input multiple-output (MIMO) degradation parameter, wherein the MIMO degradation parameter instructs the network-side device to reduce a quantity of MIMO service flows of the terminal.

10. The terminal of claim 7, wherein the degradation request comprises a CA degradation parameter comprising a channel quality indicator (CQI) equal to negative 1.

11. The terminal of claim 7, wherein the transmitter is further configured to send a capability indication message of the terminal to the network-side device before sending the degradation request to the network-side device, and wherein the capability indication message indicates that the terminal is capable of proactively initiating degradation.

12. The terminal of claim 7, wherein sending, by the transmitter, the degradation request to the network-side device comprises at least one of:
instructing, by the processor, the transmitter to send the degradation request to the network-side device when determining that heat production of the terminal is greater than or equal to a heat withstanding capacity of the terminal; or
instructing, by the processor, the transmitter to send the degradation request to the network-side device when determining that radio channel quality of the terminal is less than or equal to a preset threshold.

13. A network-side device, comprising:
a processor; and
a memory configured to store a computer executable instruction, wherein the processor is configured to execute the computer executable instruction to configure the network-side device to:
receive a degradation request from a terminal, wherein the degradation request comprises a carrier aggregation (CA) degradation parameter, and wherein the CA degradation parameter comprises an identifier of a CA component carrier and instructs the network-side device to perform CA degradation on the terminal by deactivating the CA component carrier;
determine whether the terminal is capable of proactively initiating degradation, wherein determining whether the terminal is capable of proactively initiating degradation comprises:
  determining, by the processor, whether a 117th bit of a feature group indicator (FGI) information element in a capability indication message of the terminal is 1; and
  determining that the terminal is capable of proactively initiating degradation when the 117th bit of the FGI information element in the capability indication message of the terminal is 1; and
  determining that the terminal is incapable of proactively initiating degradation when the 117th bit of the FGI information element in the capability indication message of the terminal is not 1;

when the terminal is capable of proactively initiating degradation, obtain a target to-be-degraded resource indicated by the identifier in the degradation request, wherein the target to-be-degraded resource comprises the CA component carrier that is to be deactivated when the network-side device performs CA component carrier degradation on the terminal; and degrade the target to-be-degraded resource.

14. The network-side device of claim 13, wherein the processor is further configured to receive a multiple-input multiple-output (MIMO) degradation parameter, wherein the MIMO degradation parameter instructs the network-side device to reduce a quantity of MIMO service flows of the terminal.

15. The network-side device of claim 13, wherein the CA degradation parameter comprises a channel quality indicator (CQI) equal to negative 1.

16. The network-side device of claim 13, wherein the degradation request is sent when the terminal detects that temperature of the terminal is greater than or equal to a preset threshold, wherein the degradation request is sent when the terminal estimates that heat production of the terminal is greater than or equal to a heat withstanding capacity of the terminal, and wherein the degradation request is from the terminal when radio channel quality of the terminal is less than or equal to a preset threshold.

* * * * *